United States Patent
Yang et al.

(10) Patent No.: US 8,799,382 B2
(45) Date of Patent: Aug. 5, 2014

(54) MULTI-NETWORK MULTI-PLANE STRUCTURE SHORT MESSAGE CENTRE SYSTEM AND IMPLEMENTATION METHOD THEREOF

(75) Inventors: Yikun Yang, Guangdong Province (CN); Zhengguang Chen, Guangdong Province (CN); Rongchu Nie, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 226 days.

(21) Appl. No.: 13/257,893

(22) PCT Filed: Sep. 27, 2009

(86) PCT No.: PCT/CN2009/074254
§ 371 (c)(1),
(2), (4) Date: Sep. 20, 2011

(87) PCT Pub. No.: WO2010/139150
PCT Pub. Date: Dec. 9, 2010

(65) Prior Publication Data
US 2013/0110939 A1 May 2, 2013

(30) Foreign Application Priority Data
Jun. 4, 2009 (CN) .......................... 2009 1 0107683

(51) Int. Cl.
H04L 12/703 (2013.01)
H04L 12/56 (2006.01)
H04L 29/08 (2006.01)
H04L 12/24 (2006.01)

(52) U.S. Cl.
CPC ............ *H04L 45/28* (2013.01); *H04L 67/1034* (2013.01); *H04L 41/0816* (2013.01)
USPC ............ 709/206; 709/238; 709/216; 370/235

(58) Field of Classification Search
CPC ............ H04L 12/5895; H04L 12/5855; H04L 12/5875

USPC .................... 706/206; 709/206, 238; 370/235
See application file for complete search history.

(56) References Cited

U.S. PATENT DOCUMENTS

2007/0233746 A1* 10/2007 Garbow et al. ............... 707/200
2008/0014972 A1* 1/2008 Ma et al. ....................... 455/466
2008/0140792 A1* 6/2008 Ouchi ........................... 709/206

FOREIGN PATENT DOCUMENTS

| CN | 1394089 A | 1/2003 |
| CN | 1527618 A | * 9/2004 |
| CN | 101287152 A | 10/2008 |

OTHER PUBLICATIONS

Yunchuan, Short-message center system with dual net planar structure (machine translation) May 14, 2008, p. 1-7.*
International Search Report for PCT/CN2009/074254 dated Mar. 2, 2010.

* cited by examiner

*Primary Examiner* — Oleg Survillo
*Assistant Examiner* — Joseph M Cousins
(74) *Attorney, Agent, or Firm* — Ling Wu; Stephen Yang; Ling and Yang Intellectual Property LLC

(57) ABSTRACT

A short message center system and an implementation method thereof are disclosed in the present invention, to implement the short message center system with multi-network multi-plane structure. The short message center system includes a virtual short message office and at least two short message offices. Wherein the short message office includes a signaling processing module, a service processing module and SMPP AGENT module, the virtual short message office includes a forwarding module and a returning module, the forwarding module is used to, when the module of short message office is faulted, forward a message to be processed by the faulted module to a corresponding module in another short message office to be processed, the returning module is used to return a processing result to the short message office with faulted module.

16 Claims, 6 Drawing Sheets

MULTI-NETWORK MULTI-PLANE STRUCTURE SHORT MESSAGE CENTRE SYSTEM AND IMPLEMENTATION METHOD THEREOF

TECHNICAL FIELD

The present invention relates to communication field, and especially, to a short message center system with multi-network multi-plane structure and an implementation method thereof.

BACKGROUND OF THE RELATED ART

The short message service is an important service among mobile communication services, the income thereof accounting for a growing percentage of total operator income. Hence, the operating security and stability of the short message center, the core of what provides the service, have also become a focus of increasing attention of operators and device manufacturers.

At present, there are mainly two technical schemes used by short message service, which are respectively: double-network double-plane and cluster.

Wherein, in the double-network double-plane scheme, two or more short message offices are connected to network by the way of pairwise interconnecting, and once one short message office is faulted, the other short message office may take over all the service; at the same time, the traffic is transferred from an over loaded short message center to a light loaded short message center to balance the traffic. This double-network double-plane technology improves the security and stability of short message center from disaster-tolerating and load-balancing point of view, but has the following disadvantages:

Firstly, when one short message office is faulted, all the services can only be handed over to the other office, and if the other office is also faulted or overloaded, the service will break down or be affected.

Secondly, the double-network double-plane technology requires short message office joining therein to be pairwise inter-networked. To enhance the security of the short message center, multiple short message offices are formed into a multi-network multi-plane structure, however, this networking way is very inconvenient. Because, at first, each office should record the information of all the other office, and when one office is added, deleted or modified, the data of all the other office needs to be reconfigured; next, given that there are N office in network, $N*(N-1)/2$ links need to be maintained, and the more the office are, the more complex the links are, and the more difficult the management for the links is, thus the higher the probability of faults occurring is.

Thirdly, there lacks the function of monitoring and management for the traffic load of whole system. Each node manages the traffic relevant to itself in a distributed way, without one node being able to monitor the traffic of whole network, incapable of configuring and performing a flexible load-balancing policy.

A cluster system equips each short message office with one cluster crunode server, and then manages the cluster crunode server by a cluster dispatch center, thereby implementing uniform management for two or more short message offices, also, functions as disaster-tolerating and shunting. However, the cluster system also has some disadvantages:

Firstly, its architecture is much complicated, one cluster crunode server being also needed to be built for every short message office aside from the cluster dispatch center being needed to be built.

Secondly, aside from supporting the star structure centering around the cluster dispatch center, the cluster system also supports the way of cluster crunode servers connecting to one another directly, and the disadvantages of this way are similar to the double-network double-plane structure.

Thirdly, the cluster dispatch center has only one single service processing module, without being divided into a signaling processing module, a service processing module and a short message peer to peer protocol agent (SMPP AGENT) module, only providing uniform message interface. Thus, the cluster crunode server needs to convert messages received from these three modules using different protocols into one uniform message format when exchanging messages with the cluster dispatch center, and also needs to convert protocols for messages when sending messages to these three modules. These conversions increase the burden of hardware and the time of processing messages.

Fourthly, the operation status and load condition of the short message center is reported regularly to the cluster dispatch center by cluster crunode, and the cluster dispatch center then invokes a load-balancing policy to shunt the load, and the real time property of load reporting is not strong; meanwhile, the accuracy of load reporting is also not good due to different operating systems and the processing mechanism of the short message center and the like factors.

SUMMARY OF THE INVENTION

The present invention provides a short message center system with multi-network multi-plane structure and an implementation method thereof to solve the problems of high fault probability in double-network double-plane technologies and the complex architecture of cluster system technologies.

The short message center system with multi-network multi-plane structure of present invention includes a virtual short message office and at least two short message offices, said short message office including a signaling processing module, a service processing module and a SMPP AGENT module, said virtual short message office including a forwarding module and a returning module, said forwarding module is used to, when a module of a short message office is faulted, forward a message to be processed by the faulted module to a corresponding module in another short message office to be processed, said returning module is used to return a processing result to the short message office with faulted module.

In the above system, said forwarding module is a virtual signaling processing module, and said returning module is a virtual service processing module, wherein, said virtual signaling processing module is used to, when a signaling processing module of the short message offices is faulted, forward a message to be processed by the faulted signaling processing module to a signaling processing module in another short message office to process the message;

said virtual service processing module is used to return a processing result to the service processing module of a short message office with the faulted signaling processing module.

In the above system, said forwarding module is a virtual service processing module, and said returning module is a virtual signaling processing module, wherein, said virtual service processing module is used to, when the service processing module of short message office is faulted, forward a message to be processed by the faulted service processing module to a service processing module in another short message office to process the message;

said virtual signaling processing module is used to return a processing result to the signaling processing module of a short message office with the faulted service processing module.

In the above system, said forwarding module is a virtual service processing module, and said returning module is a virtual SMPP AGENT module, wherein, said virtual service processing module is used to, when a service processing module of short message offices is faulted, forward a message to be processed by the faulted service processing module to a service processing module in another short message office to process the message;

said virtual SMPP AGENT module is used to return a processing result to the SMPP AGENT module of a short message office with the faulted service processing module.

In the above system, said forwarding module is a virtual SMPP AGENT module, and said returning module is a virtual service processing module, wherein, said virtual SMPP AGENT module is used to, when a SMPP AGENT module of the short message offices is faulted, forward a message to be processed by the faulted SMPP AGENT module to a SMPP AGENT module in another short message office to process the message;

said virtual service processing module is used to return a processing result to the service processing module of a short message office with faulted SMPP AGENT module.

In the above system, said virtual short message office further includes a configuration management module, said configuration management module being used to monitor the load status of each module of said short message offices, provide a shunt policy for said forwarding module so that the forwarding module selects a module with minimum load to which the message is forwarded according to the load status of each module.

A method for implementing a short message center system with multi-network multi-plane structure of the present invention comprises the following steps of:

creating a virtual short message office connected with at least two short message offices;

a forwarding module of said virtual short message office receiving a message sent by a module of the short message offices, and forwarding the message to a corresponding module of another short message office to process the message;

a returning module of said virtual short message office receiving a processing result, and returning the processing result to the module of the original short message office sending the message.

For the above method, before said returning module returns the processing result to the module of the original short message office sending the message, the method further includes:

a configuration management module of said virtual short message office creating a forwarding relation table, and setting identification information of the original short message office, identification information of modules of the original short message office, and identification information of other corresponding short message offices processing the message, and identification information of corresponding modules of other short message offices in said forwarding relation table to be queried by said returning module to return said processing result.

For the above method, before said forwarding module forwards the message to a corresponding module of another short message office to process the message, the method further includes:

a configuration management module of said virtual short message office monitoring load status of each module of said short message office, providing a shunt policy for said forwarding module so that the forwarding module selects a corresponding module with minimum load to which the message is forwarded according to the load status of each module.

In the above method, said forwarding module, a returning module, a module sending the message, a module processing the message are respectively one group of the followings: ① a virtual signaling processing module, a virtual service processing module, a service processing module, a signaling processing module; ② a virtual service processing module, a virtual signaling processing module, a signaling processing module, a service processing module; ③ a virtual service processing module, a virtual SMPP AGENT module, a SMPP AGENT module, a service processing module; or a virtual SMPP AGENT module, a virtual service processing module, a service processing module, a SMPP AGENT module.

In comparison with current technologies, by applying the short message center system with multi-network multi-plane structure and the implementation method thereof of the present invention, once a certain module or all the modules of a certain real short message office is/are faulted, a virtual short message office may share its services to a corresponding module of another real short message office working normally, thereby services are ensured not to be interrupted. The short message center system with multi-network multi-plane structure of the present invention simplifies the system structure, is simpler than the system with multi-network multi-plane structure acquired by expansion based on the existing double-network double-plane technologies or a cluster system in its implementation approach, and brings convenience and flexibility in aspects such as link management, operation and maintenance, load-balancing policy and so on. In addition, the advantages of being strong in integration, convenient in expansion and management, flexible in load-balancing policy of this system make the short message center system have better security and stability.

PREFERRED EMBODIMENTS OF THE PRESENT INVENTION

The short message center system with multi-network multi-plane structure and implementation method thereof of the present invention are illustrated in conjunction with the following drawings.

Figure 1:
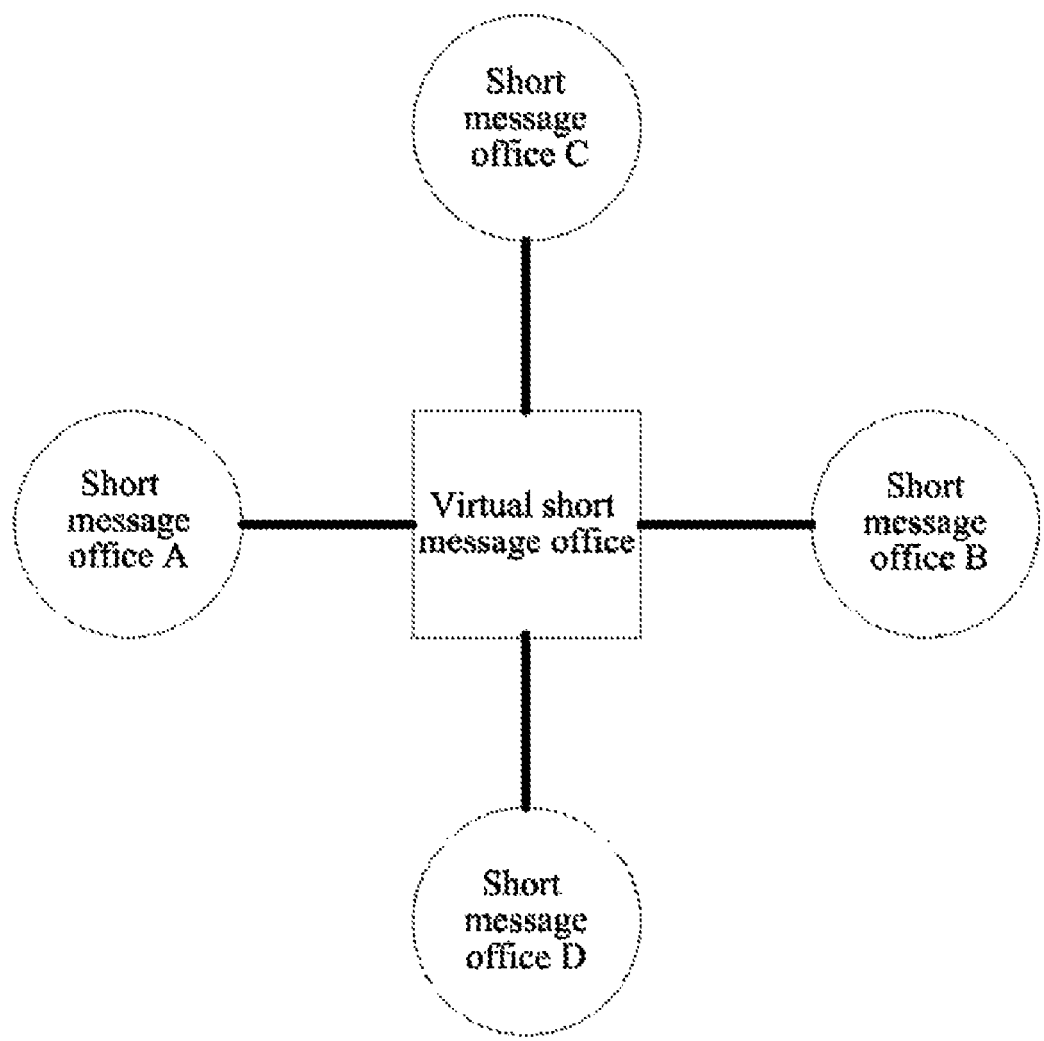
FIG. 1 is a schematic diagram of the structure of a short message center system with multi-network multi-plane structure of the present invention.

Please refer to FIG. 1, it illustrates the structure of a short message center system with multi-network multi-plane structure of the present invention.

The short message center system with multi-network multi-plane structure of the present invention includes a virtual short message office, short message office A, short message office B, short message office C and short message office D. Relative to the virtual short message office, short message office A, short message office B, short message office C and short message office D may be called real short message offices.

Short message office A, short message office B, short message office C and short message office D are connected with the virtual short message office respectively, thereby a star network centering around the virtual short message office is formed, called as a multi-network multi-plane structure. The existing double-network double-plane technologies are used in the connection between the real short message offices and the virtual short message office, and the virtual short message office monitors and manages the traffic and status of each node, receives and forwards messages from each real short message office according to a configurable load-balancing policy. The multi-network multi-plane structure is transparent and invisible to each real short message office, and only the virtual short message office knows which real short message offices have joined the multi-network multi-plane structure. The virtual short message office receives specific services, but it doesn't process the specific service, instead it forwards the services to the real short message offices for processing therein according to a load-balancing policy.

Figure 2:
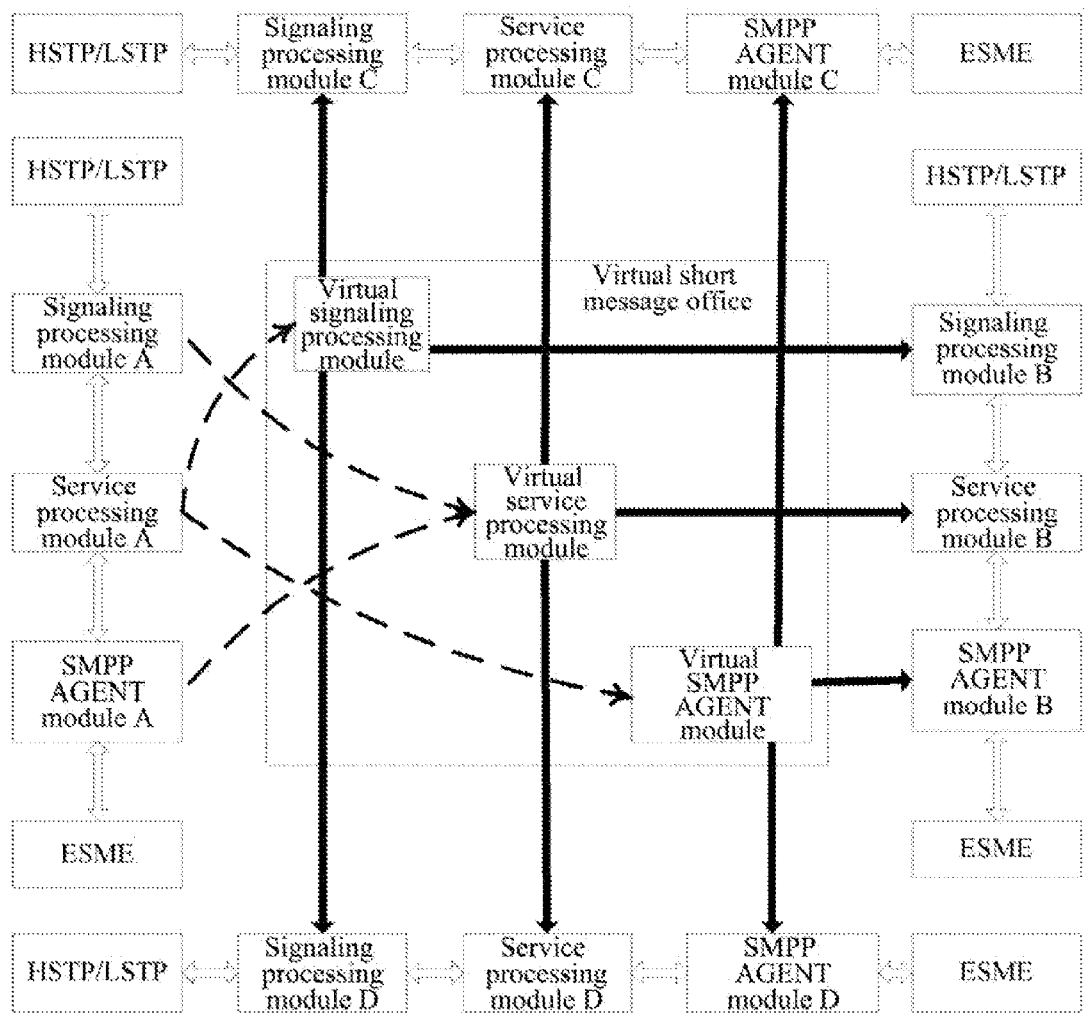
FIG. 2 is a schematic diagram of modules of a short message center system with multi-network multi-plane structure of the present invention.
Figure 3:
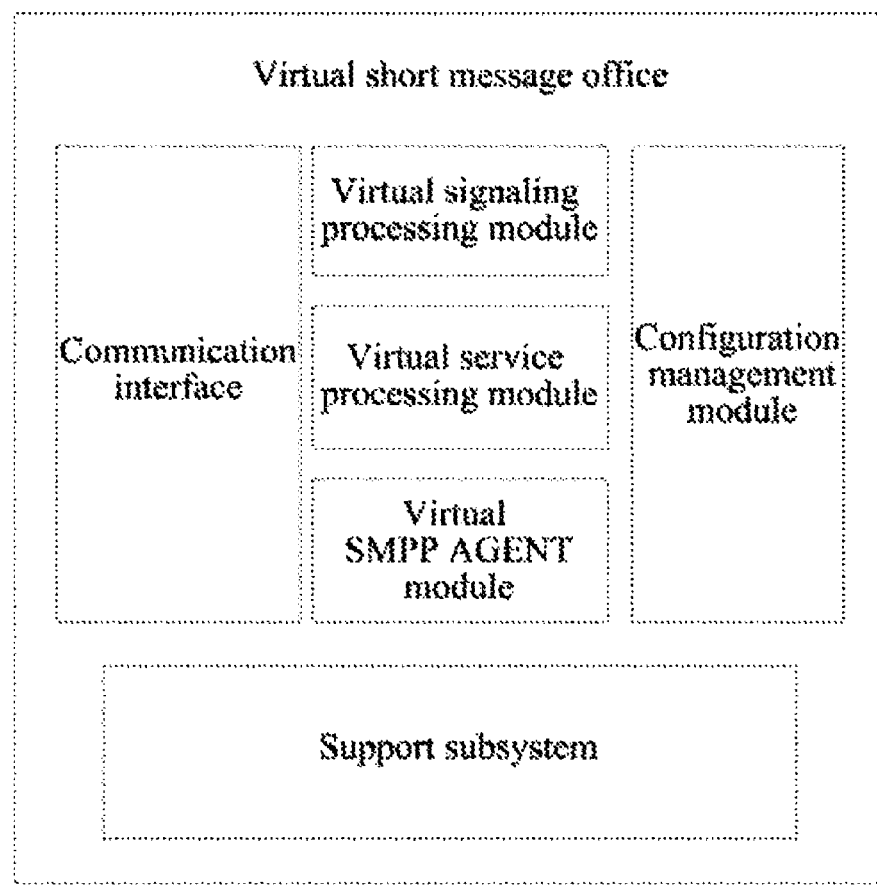
FIG. 3 is a schematic diagram of the modules of the virtual short message office of a short message center system with multi-network multi-plane structure of the present invention.

Please refer to FIG. 2 and FIG. 3. FIG. 2 illustrates the modules of a short message center system with multi-network multi-plane structure of the present invention, and FIG. 3 illustrates the modules of the virtual short message office of a short message center system with multi-network multi-plane structure of the present invention.

Short message office A, short message office B, short message office C and short message office D are connected respectively with a plurality of high level/low level signaling transfer points (HSTP/LSTP) and a plurality of extended short message entities (ESME) in network, and the virtual short message office is connected respectively with short message office A, short message office B, short message office C and short message office D. HSTP/LSTP implements router's function to connect other signaling points with network together to form a larger network. They generally do not generate messages, but check every message sent by service exchange points, and then switch every message to where it should be through No. 7 signaling network. In the short message services, STP is connected with a signaling processing module, and is in charge of forwarding originating call, terminating call messages between a mobile phone and the short message center system. ESME is a short message entity in non-PLMN mobile networks, is generally connected to SMPP AGENT module by TCP/IP or X.25 network, and uses SMPP protocol and SMPP AGENT protocol to communicate for receiving and sending short messages.

Short message office A includes signaling processing module A, service processing module A and SMPP AGENT module A. Internally, signaling processing module A is connected with SMPP AGENT module A through service processing module A; Externally, the short message office A is connected with HSTP/LSTP in No. 7 signaling network through signaling processing module A, and is connected with ESME through SMPP AGENT module A. Similarly, short message office B, short message office C and short message office D also include the corresponding modules.

The function of each module is illustrated specifically by exemplifying short message office A below:

Signaling processing module A: connected with HSTP/LSTP in network and service processing module A of short message office A respectively, providing a signaling channel for receiving and sending a short message between short message center and mobile network, and completing protocol conversion. Signaling processing module A is in charge of receiving messages of No. 7 signaling network, and processes them into internal messages, and then forwards them to service processing module A; meanwhile, it receives internal messages sent by service processing module A and sends them to No. 7 signaling network after processing them into standard signaling.

Service processing module A: connected with signaling processing module A and SMPP AGENT module A respectively, and in charge of processing specific short message services. Service processing module A is in charge of receiving messages from signaling processing module A or SMPP AGENT module A, and forwarding them to signaling processing module A or SMPP AGENT module A respectively after processing them.

SMPP AGENT module A: connected with service processing module A and ESME respectively, providing a channel for receiving and sending a message between short message center and ESME, and completing protocol conversion. SMPP AGENT module A is in charge of receiving messages from ESME in external network (TCP/IP or X.25), and processing them into internal messages, and then forwarding them to service processing module A; meanwhile, it receives internal messages sent by service processing module A, and sends them to ESME after processing them into messages which comply with SMPP protocol.

The virtual short message office includes a virtual signaling processing module, a virtual service processing module, a virtual SMPP AGENT module, a configuration management module, a support subsystem and a communication interface. Wherein, the three modules of the virtual signaling processing module, the virtual service processing module and the virtual SMPP AGENT module are connected with every real short message office respectively, but they are not interconnected, i.e. there is no message flow between the internal modules of the virtual short message office.

Virtual signaling processing module: connected with signaling processing modules and service processing modules of all the real short message offices respectively, providing a forwarding channel for messages sent to the signaling processing module. The virtual signaling processing module receives messages from service processing modules of real short message offices, and forwards messages to the signaling processing module of a certain real short message office by the way of load balancing.

Virtual service processing module: connected with service processing modules, signaling processing modules and SMPP AGENT modules of all the real short message offices respectively, and providing a forwarding channel for messages sent to the service processing modules.

Virtual SMPP AGENT module: connected with service processing modules and SMPP AGENT modules of all the real short message offices respectively, and providing a forwarding channel for messages sent to the signaling processing modules.

Configuration management module: being in charge of configuration and management functions such as node configuring, node status monitoring, node load monitoring, shunt policy configuring and so on, and maintaining the binding information of ESME in each SMPP AGENT module. The node refers to each module of each real short message office.

Support subsystem: in charge of providing running support of the whole software system.

Communication interface: being in charge of communication of a virtual signaling processing module, a virtual service processing module and a virtual SMPP AGENT module with external system, and it may be integrated in the support subsystem.

In FIG. 2, the communication links for a real short message office to send a message to the virtual short message office, taking short message office A as an example, are indicated in dashed lines; the communication links for the virtual short message office to forward a message to real short message offices, taking short message office B, short message office C, and short message office D as examples, are indicated with black one-way arrows.

The signaling processing modules, the service processing modules, and the SMPP AGENT modules are classified into three levels, where a receiving channel of each module of the virtual short message office only receives messages sent by the module of adjacent level of a real short message office, and a sending channel only sends messages to a module of same level of a real short message office. Namely, each module of the virtual short message office can receive services, but cannot process services, and can only forward messages to a corresponding module of a real short message office to process the messages by the way of forwarding. And for real short message offices, they don't know that the virtual short message office cannot process services, so they will send messages to the level, which should process services, of the virtual short message office, however, the virtual short message office cannot process services, and will choose one target real short message office module by a load-balancing mechanism, disguise the messages as those to be sent to this module, and forward the messages to this module. Meanwhile, when the target real short message office module finishes processing the messages and returns a response result to the virtual short message office, it also regards the virtual short message office as the real short message office, and sends the response result to the module, which should process services, of the virtual short message office.

Message channels of each module are relatively independent, therefore, when a certain module among the signaling processing module, the service processing module and the SMPP AGENT module of a real short message office is faulted, only messages to be processed by the module will be forwarded to the virtual short message office and then forwarded to a corresponding module of other real short message offices to be processed, and the modules without faults may continue to work normally, and may further be used to receive messages of other real short message offices forwarded by the virtual short message office. Hence, the virtual short message office needs to monitor the traffic and the working status of each module of each real short message office, and this function is implemented by the configuration management module of the virtual short message office.

Figure 4:
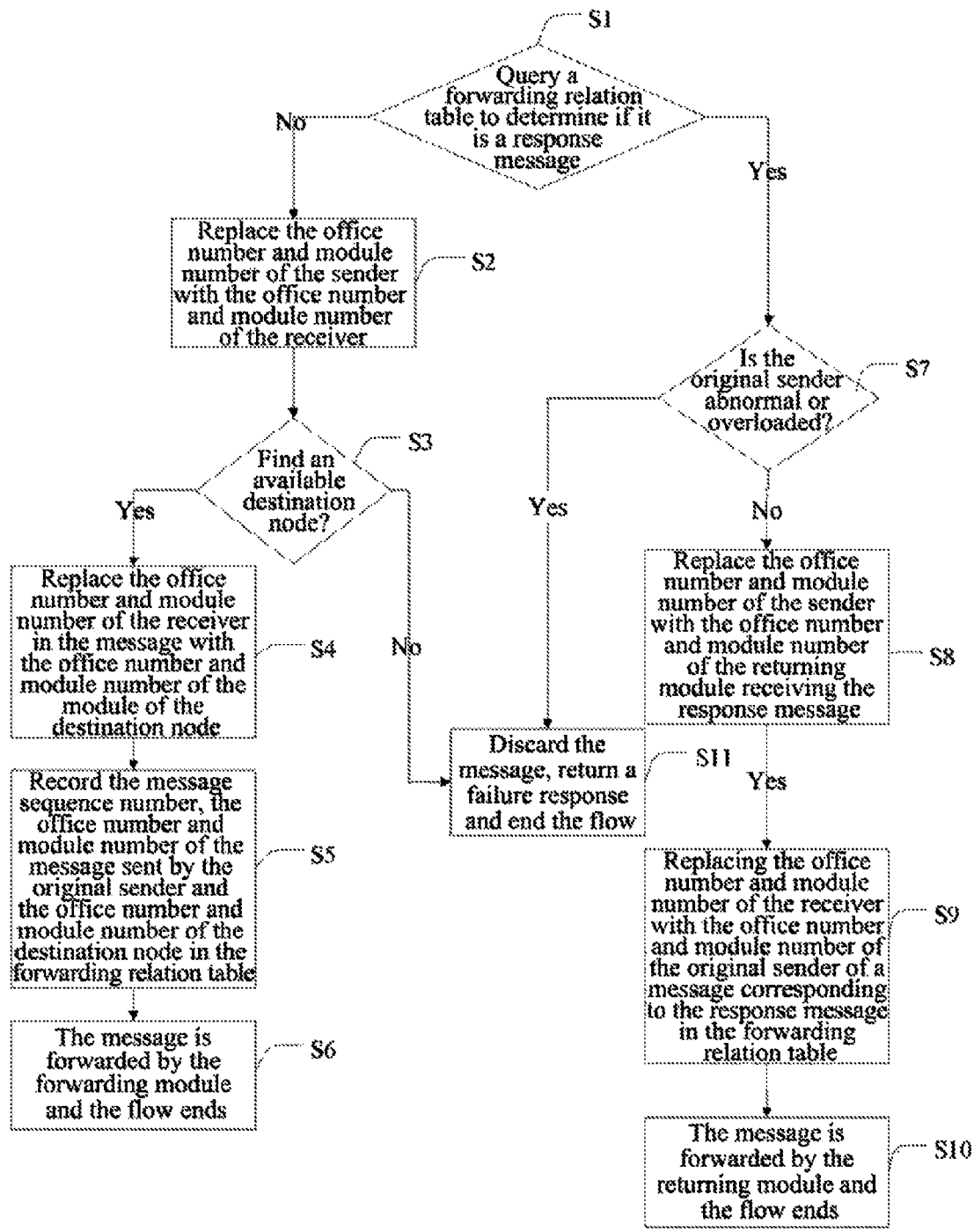
FIG. 4 is a flow schematic diagram of the method for implementing a short message center system with multi-network multi-plane structure of the present invention.

Please refer to FIG. 4, it illustrates the flow of the method for implementing a short message center system with multi-network multi-plane structure of the present invention.

The receiver and returning module to be mentioned hereinafter is one of the virtual signaling processing module, the virtual service processing module and the virtual SMPP AGENT module of the virtual short message office, and the sender is one of the signaling processing module, the service processing module or the SMPP AGENT module of the real short message office, and the identification information of the virtual short message office and the real short message office is an office number, and the identification information of modules of the virtual short message office and the real short message office is a module number. The method for implementing a short message center system with multi-network multi-plane structure of the present invention includes the following steps:

Step S1, the receiver receives a message from the sender, wherein the message includes an event number, the office number and module number of the sender, the office number and module number of the receiver, a message sequence number and a message body; the receiver queries a forwarding relation table recording message forwarding history created by the configuration and management module according to message sequence number and office number and module number of the sender; if relevant records are found, it indicates that it is one response message of a message forwarded by the virtual short message office, and the receiver needs to return the response message in a path recorded in the forwarding relation table, and executes step S7; otherwise, it indicates that it is not a response message but an ordinary message to be forwarded, and then step S2 is executed.

Step S2, in the messages received, the office number and module number of the sender are replaced with the office number and module number of the receiver.

Step S3, the load-balancing policy formulated by the configuration management module is invoked to inquire the operation status and load of each node (each module of the real short message office), and one available node with normal operation status and under load is chosen as a destination node for forwarding a message. If no available node is found, step S11 is executed, otherwise it proceeds to step S4.

Step S4, an available destination node is found, and the office number and module number of the destination node is used to replace the office number and module number of the receiver in the message to indicate that the message is to be forwarded to the destination node, and the destination node processes the message and obtains a processing result, namely a response message.

Step S5, the configuration management module records the message sequence number, the office number and module number of the message sent by the original sender and the office number and module number of the destination node in the forwarding relation table, so as to return the response message to the original sender according to the forwarding relation table after the returning module receives the response message.

Step S6, the message is forwarded by the forwarding module and the flow ends.

Step S7, the message is judged to be a response message and is needed to be forwarded to the original sender, then the forwarding relation table is queried for the operation status and load condition of the original message sender, if the operation status of the original message sender is abnormal or the original message sender is overloaded, then step S11 is skipped to, otherwise, step S8 is executed.

Step S8, the office number and module number of the sender is replaced with the office number and module number of the returning module receiving the response message, and step S9 is executed.

Step S9, the office number and module number of the receiver is replaced with the office number and module number of the original sender of a message corresponding to the response message in the forwarding relation table to indicate that the response message is to be forwarded back to the original sender.

Step S10, the message is forwarded by the returning module and the flow ends.

Step S11, the message is discarded and a failure response is returned, and the flow ends.

Figure 5:
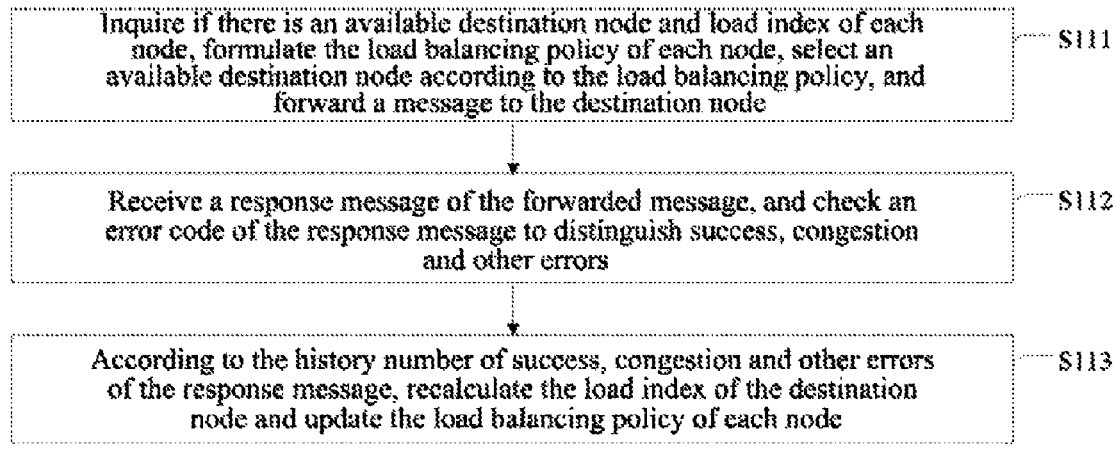
FIG. 5 is a working flowchart of the configuration management module of a short message center system with multi-network multi-plane structure of the present invention.

Please refer to FIG. 5, it illustrates a working flowchart of the configuration management module of a short message center system with multi-network multi-plane structure of the present invention.

In the above step S3, one important function of the configuration management module is to monitor the load condition of each module of the real short message offices, and working steps thereof are as follows:

Step S111, inquire if there is an available destination node (a certain module of the real short message offices) and load index of each node, and formulate a load-balancing policy for each node; select an available destination node according to the load-balancing policy (such as sending to the minimum load index node in priority), and forward a message to the destination node.

Step S112, receive a response message of the forwarded message, and check an error code of the response message to distinguish success, congestion and other errors.

Step S113, according to the history number of success, congestion and other errors of the response message, recalculate the load index of the destination node, and update the load-balancing policy of each node.

The originating call and response message process of one mobile-to-mobile short message is exemplified below.

Figure 6:
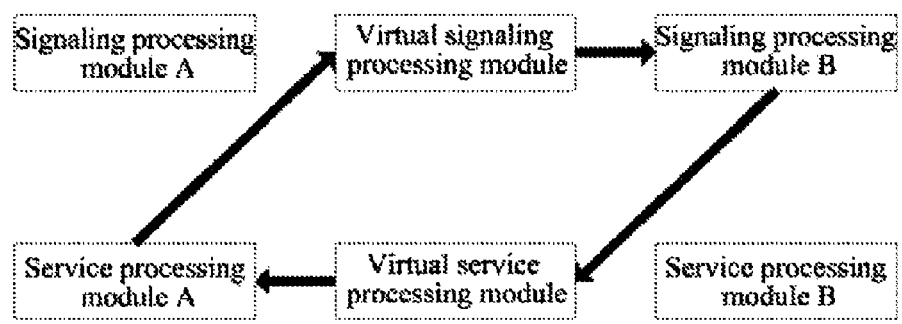
FIG. 6 is a schematic diagram of a first example of the method for implementing a short message center system with multi-network multi-plane structure of the present invention.

Please refer to FIG. 6, it illustrates a first example of the method for implementing a short message center system with multi-network multi-plane structure of the present invention.

Given that the module being faulted is signaling processing module A of short message office A, it is signaling processing module B of short message office B that replaces it to process messages according to the load-balancing policy of each node.

For a MO message from No. 7 signaling network, when signaling processing module A of short message office A is faulted, HSTP/LSTP module A will send the MO message to the signaling processing module of another real short message office working normally connected to it, and the MO message is processed.

For a MT internal message sent to signaling processing module A by service processing module A, when service processing module A finds that there is no available signaling processing module A in this office, i.e. short message office A, it will send the MT message to the virtual signaling processing module of the virtual short message office. The virtual signaling processing module doesn't process the MT internal message after receiving it, and forwards the message to the signaling processing module of another real short message office in multi-network multi-plane according to the load-balancing policy of each node. Given that the message is sent to signaling processing module B of short message office B, then the short message office B implements this short message terminating call process. Signaling processing module B doesn't know that this message is forwarded from the same level of the virtual signaling module, instead regards it as the message sent by the opposite end office of the double-network double-plane system, i.e. the virtual service processing module of the virtual short message office to process the message, and returns the MT response message to the virtual service processing module of the virtual office. After receiving the MT response, the virtual service processing module judges it to be a response message, and forwards the response message back to service processing module A of short message office A, also, service processing module A doesn't know this message is forwarded from the same level of the virtual service module either, instead regards it as the message returned by the opposite end office of the double-network double-plane system, i.e. the virtual signaling processing module of the virtual short message office to process the message, thereby the terminating call process is completed.

Figure 7:
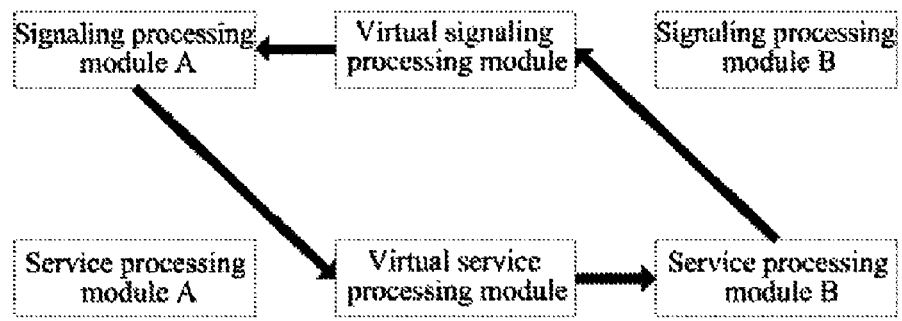
FIG. 7 is a schematic diagram of a second example of the method for implementing a short message center system with multi-network multi-plane structure of the present invention.

Please refer to FIG. 7; it illustrates a second example of the method for implementing a short message center system with multi-network multi-plane structure of the present invention.

Given that the module being faulted is service processing module A of short message office A, it is service processing module B of short message office B that replaces it to process messages according to the load-balancing policy of each node.

For a MO message from No. 7 signaling network, when signaling processing module A of short message office A finds that service processing module A is faulted, it will send the MO message to the virtual service processing module of the virtual short message office, and after receiving a response, the virtual service processing module forwards the MO message to the service processing module of another real short message office in the multi-network multi-plane system according to the load-balancing policy of each node. Given that the message is sent to service processing module B of short message office B, then the short message office B implements this short message originating call process. Service processing module B regards the MO message as the message sent by the virtual signaling processing module of the virtual short message office, and returns the processed response information to the virtual signaling processing module. After receiving the response, the virtual signaling processing module judges it to be a response message, and returns the response message to signaling processing module A, and signaling processing module A regards the response message as a message processing result returned by the virtual service processing module of the virtual short message office, and sends it to No. 7 signaling network, thereby the mobile-to-mobile short message originating call and terminating call process is completed.

Figure 8:
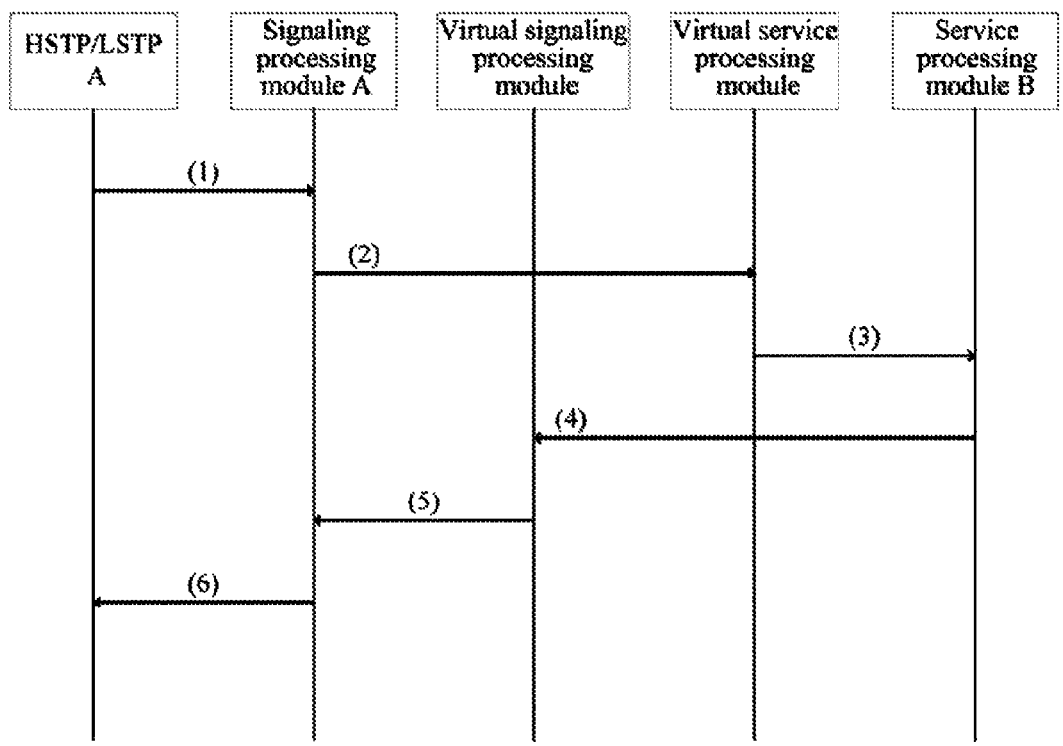
FIG. 8 is a flow chart of a second example of the method for implementing a short message center system with multi-network multi-plane structure of the present invention.

Please refer to FIG. 8, it illustrates the flow of a second example of the method for implementing a short message center system with multi-network multi-plane structure of the present invention.

The flow of the second example is as follows:

(1) HSTP/LSTP sends short messages to signaling processing module A by standard signaling;

(2) Signaling processing module A converts short messages into internal message structure, and checks the working status of service processing module A, and finds service processing module A is faulted, thus sends short messages to the virtual service processing module;

(3) After receiving an internal message sent by signaling processing module A, the virtual service processing module judges it to be a non-response message, and forwards the message to service processing module B;

(4) Service processing module B processes the message after receiving it, and returns a processing result, i.e. a response message, to the virtual signaling processing module of opposite end office after processing it successfully, thereby the terminating call process is completed;

(5) After receiving the response message, the virtual signaling processing module judges it to be a response message, and forwards the response message to signaling processing module A;

(6) After receiving the response message, signaling processing module A converts the response message from internal message to standard signaling and sends it to HSTP/LSTP module A, thereby the originating process is completed.

For an internal message sent to service processing module A by SMPP AGENT module A, when SMPP AGENT module A finds that there is no available service processing module A, it will send the internal message to the virtual service processing module of the virtual short message office. When the virtual service processing module receives the internal message, it forwards the message to the service processing module of another real short message office in the multi-network multi-plane system according to the load-balancing policy of each node. Given that the message is sent to service processing module B of short message office B, the short message office B implements this short message terminating call process. Service processing module B doesn't know that this message is forwarded from the same level of the virtual service module, instead regards it as the message sent by the virtual SMPP AGENT module of the opposite end office of the virtual short message office of the double-network double-plane system to process the message, and returns the response message to the virtual SMPP AGENT module of the virtual short message office. After receiving the response, the virtual SMPP AGENT module judges it to be a response message, and forwards the response message back to SMPP AGENT module A of short message office A, also, SMPP AGENT module A doesn't know the response message is forwarded from the same level of the virtual SMPP AGENT module either, instead regards it as a message processing result returned by the virtual service processing module of opposite end office of the double-network double-plane system.

Figure 9:
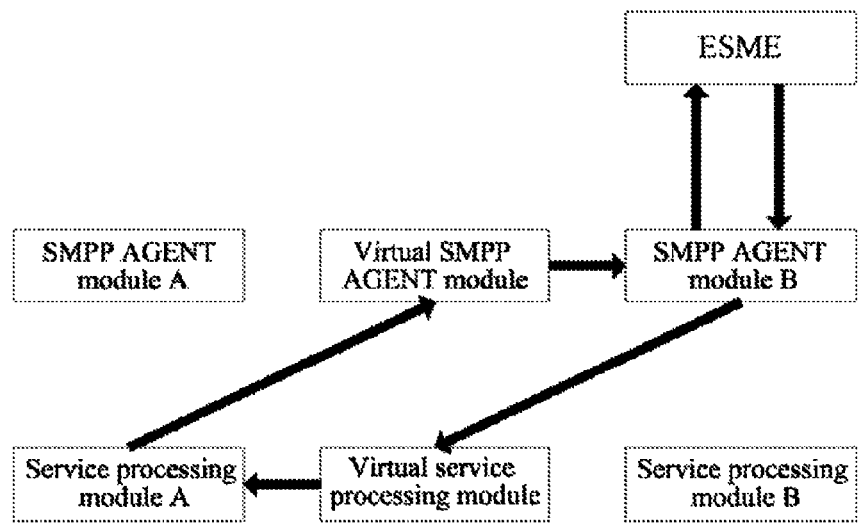
FIG. 9 is a schematic diagram of a third example of the method for implementing a short message center system with multi-network multi-plane structure of the present invention.

Please refer to FIG. 9; it illustrates a third example of the method for implementing a short message center system with multi-network multi-plane structure of the present invention.

Given that the module being faulted is SMPP AGENT module A of short message office A, it is SMPP AGENT module B of short message office B that replaces it to process messages according to the load-balancing policy of each node.

When SMPP AGENT module A is faulted, ESME can't be bound to the virtual short message office since the virtual SMPP AGENT module doesn't have the function of a real SMPP AGENT. For an AO message initiated by ESME, if ESME binds the SMPP AGENT modules of other real short message offices at the same time, it may submit the AO message to these SMPP AGENTs working normally to process the message.

The virtual SMPP AGENT module doesn't provide the binding function of ESME and can't process an AO message, but it may forward an AT message to ESME. To implement this function, the virtual short message office needs to synchronize the binding information of ESME with each real short message office connected with it. When service processing module A sends the AT message to ESME, it finds SMPP AGENT module A is faulted, and sends the AT message to the virtual SMPP AGENT module, after the SMPP AGENT module inquires the binding information of ESME, it forwards the AT message to the SMPP AGENT module of another real short message office bound to ESME, given the SMPP AGENT module B of short message office B, according to the load-balancing policy of each node. SMPP AGENT module B doesn't know the message is forwarded from the same level of the virtual SMPP AGENT module, instead regards it as the message sent by the virtual service processing module, and sends the message to ESME. After receiving the message, ESME returns a response message to SMPP AGENT module B. SMPP AGENT module B returns the response message to the virtual service processing module, and after the virtual service processing module judges it to be the response message, it is forwarded to service processing module A.

In comparison with the prior art, by applying the short message center system with multi-network multi-plane structure and implementation method thereof of the present invention, once a certain module or all the modules of a certain real short message office is/are faulted, a virtual short message office may share its services to a corresponding module of another real short message offices working normally, thereby services are ensured not to be interrupted. The short message center system with multi-network multi-plane structure of the present invention simplifies the system structure, and is simpler than the system with multi-network multi-plane structure acquired by expansion based on the existing double-network double-plane technologies or a cluster system in implementation approach, and brings the convenience and flexibility in aspects such as links management, operation and maintenance, a load-balancing policy and so on. In addition, the advantages of being strong in integration, convenient in expansion and management, and flexible in load-balancing policy of this system make the short message center system have better security and stability.

The above are simply the preferred examples of the present invention, not to limit the present invention, and for the person skilled in the art, there are different kinds of modifications and variations on the present invention. All the modifications, equivalent replacements, improvements and so on made in the spirit and principle of the present invention are included in the protection scope of the present invention.

INDUSTRIAL APPLICABILITY

In comparison with current technologies, by applying the short message center system with multi-network multi-plane structure and the implementation method thereof of the present invention, once a certain module or all the modules of a certain real short message office is/are faulted, a virtual short message office may share its services to a corresponding module of another real short message office working normally, thereby services are ensured not to be interrupted. The short message center system with multi-network multi-plane structure of the present invention simplifies the system structure, is simpler than the system with multi-network multi-plane structure acquired by expansion based on the existing double-network double-plane technologies or a cluster system in its implementation approach, and brings the convenience and flexibility in aspects such as links management, operation and maintenance, load-balancing policy and so on. In addition, the advantages of being strong in integration, convenient in expansion and management, flexible in load-balancing policy of this system make the short message center system have better security and stability.

What is claimed is:

1. A method for implementing a short message center system, comprising the steps of:
   creating a virtual short message office connected with at least two short message offices; wherein, each short message office comprises at least one computer processor which implements: a signaling processing module, a service processing module, and a short message peer to peer protocol agent (SMPP AGENT) module, said signaling processing module is connected to said SMPP AGENT module through said service processing module and they are structured in three separate layers; and said virtual short message office comprises at least one computer processor which implements: a virtual signaling processing module, a virtual service processing module, and a virtual SMPP AGENT module which are not connected and do not communicate with each other, and a configuration management module; wherein, the virtual signaling processing module is structured in the same layer with the signaling processing modules of the short message offices, the virtual service processing module is structured in the same layer with the service processing modules of the short message offices, and the virtual SMPP AGENT module is structured in the same layer with the SMPP AGENT modules of the short message offices;

each virtual module of said virtual short message office only receiving messages sent from the modules of the short message offices in the adjacent layer, and selecting another short message office based on a configured load-balancing policy and forwarding the messages to the module of the selected short message offices which is in the same layer with the virtual module;

the configuration management module maintaining a forwarding relation table that stores an association relation including, for each message: identification information of the short message office with the module sending the message, identification information of a module of the short message office with the module sending the message, and identification information of the short message office with the module which the message is forwarded to, identification information of a module which the message is forwarded to;

after the message is processed at a corresponding module of the selected short message office, a response message being returned to a virtual module of the virtual short message office which is adjacent to the corresponding module of the selected short message office;

the said virtual module of the virtual short message office querying the forwarding relation table to determine the module of the original sending short message to receive the response message, and returning the response message to the original sending short message office, thereby returning the response messages to the modules of the original sending short message offices based on the forwarding relation table;

wherein, the communication channels between the different layers are independent to each other, so when any module from any of the short message offices fails, only the messages that need to be processed by the failed module will be forwarded to a module in the virtual short message office and be further forwarded to the corresponding module of a different short message office in the same layer for processing, other modules in the short message offices that do not fail will continue normal operation.

2. The method according to claim 1, before the step of selecting another short message office based on a configured load-balancing policy, further comprising:
the configuration management module monitoring load status of modules of said at least two short message offices which are corresponding to the faulted module, and providing the load-balancing policy for the virtual module which is corresponding to the faulted module.

3. The method according to claim 1, wherein, when the signaling processing module of one of the at least two short message offices fails, the step of said receiving, selecting and forwarding comprises:
the virtual signaling processing module receiving an MT message from the service processing module of the one short message office which is sent originally to the faulted signaling processing module of the one short message office, selecting another short message office based on the configured load-balancing policy, and forwarding the MT message to the signaling processing module of the selected short message office in the same layer; and
the virtual service processing module receiving an MT response message from the signaling processing module of the selected short message office, and forwarding the MT response message to the service processing module of the one short message office according to the forwarding relation table.

4. The method according to claim 1, wherein, when the service processing module of one of the at least two short message offices fails, the step of said receiving, selecting and forwarding comprises:
the virtual service processing module receiving an MO message from the signaling processing module of the one short message office which is sent originally to the faulted service processing module of the one short message office, selecting another short message office based on the configured load-balancing policy, and forwarding the MO message to the service processing module of the selected short message office in the same layer; and
the virtual signaling processing module receiving an MO response message from the service processing module of the selected short message office, and forwarding the MO response message to the signaling processing module of the one short message office according to the forwarding relation table.

5. The method according to claim 1, wherein, when the service processing module of one of the at least two short message offices fails, the step of said receiving, selecting and forwarding comprises:
the virtual service processing module receiving an AO message from the SMPP AGENT module of the one short message office which is sent originally to the faulted service processing module of the one short message office, selecting another short message office based on the configured load-balancing policy, and forwarding the AO message to the service processing module of the selected short message office in the same layer; and
the virtual SMPP AGENT module receiving an AO response message from the service processing module of the selected short message office, and forwarding the AO response message to the SMPP AGENT module of the one short message office according to the forwarding relation table.

6. The method according to claim 1, wherein, when the SMPP AGENT module of one of the at least two short message offices fails, the step of said receiving, selecting and forwarding comprises:
the virtual SMPP AGENT module receiving an AT message from the service processing module of the one short message office which is sent originally to the faulted SMPP AGENT module of the one short message office, selecting another short message office based on the configured load-balancing policy, and forwarding the AT message to the SMPP AGENT module of the selected short message office in the same layer; and the virtual service processing module receiving an AT response message from the SMPP AGENT module of the selected short message office, and forwarding the AT response message to the service processing module of the one short message office according to the forwarding relation table.

7. A short message center system, comprising a virtual short message office and at least two short message offices which are connected with the virtual short message office, wherein, each short message office comprises at least one computer processor which implements: a signaling processing module, a service processing module, and a short message peer to peer protocol agent (SMPP AGENT) module, wherein said signaling processing module is connected to said SMPP AGENT module through said service processing module and they are structured in three separate layers;

said virtual short message office comprises at least one computer processor which implements: a virtual signaling processing module, a virtual service processing module, and a virtual SMPP AGENT module which are not connected and do not communicate with each other, and a configuration management module;

wherein, the virtual signaling processing module is structured in the same layer with the signaling processing modules of the short message offices, the virtual service processing module is structured in the same layer with the service processing modules of the short message offices, and the virtual SMPP AGENT module is structured in the same layer with the SMPP AGENT modules of the short message offices;

wherein, each virtual module of said virtual short message office only receives messages sent from the modules of the short message offices in the adjacent layer but does not process the received messages, and only selects another short message office based on a configured load-balancing policy and forwards the messages to the corresponding module of the selected short message office which is in the same layer with the virtual module;

wherein the configuration management module maintains a forwarding relation table that stores an association relation including, for each message: identification information of the short message office with the module sending the message, identification information of a module of the short message office with the module sending the message, and identification information of the short message office with the module which the message is forwarded to, identification information of a module which the message is forwarded to;

wherein, after the message is processed at a corresponding module of the selected short message office, a response message is returned to a virtual module of the virtual short message office, the said virtual module of the virtual short message office queries the forwarding relation table to determine the module of the original sending short message to receive the response message, and returns the response message to the original sending short message office, thereby returning the response messages to the modules of the original sending short message offices based on the forwarding relation table;

wherein, the communication channels between the different layers are independent to each other, so when any module from any of the short message offices fails, only the messages that need to be processed by the failed module will be forwarded to a module in the virtual short message office and be further forwarded to a corresponding module of a different short message office in the same layer for processing, other modules in the short message offices that do not fail will continue normal operation.

8. The system according to claim 7, wherein, when the signaling processing module of one of the at least two short message offices fails, the virtual signaling processing module is configured to: receive an MT message from the service processing module of the one short message office which is sent originally to the faulted signaling processing module of the one short message office, select another short message office based on the configured load-balancing policy, and forward the MT message to the signaling processing module of the selected short message office in the same layer; and the virtual service processing module is configured to: receive an MT response message from the signaling processing module of the selected short message office, and forward the MT response message to the service processing module of the one short message office based on the forwarding relation table.

9. The system according to claim 8, wherein, said configuration management module is further configured to monitor load status of modules of said at least two short message offices which are corresponding to the faulted module, and provide the load-balancing policy for the virtual module which is corresponding to the faulted module.

10. The system according to claim 7, wherein, when the service processing module of one of the at least two short message offices fails, the virtual service processing module is configured to: receive an MO message from the signaling processing module of the one short message office which is sent originally to the faulted service processing module of the one short message office, select another short message office based on the configured load-balancing policy, and forward the MO message to the service processing module of the selected short message office in the same layer; and the virtual signaling processing module is configured to: receive an MO response message from the service processing module of the selected short message office, and forward the MO response message to the signaling processing module of the one short message office based on the forwarding relation table.

11. The system according to claim 10, wherein, said configuration management module is further configured to monitor load status of modules of said at least two short message offices which are corresponding to the faulted module, and provide the load-balancing policy for the virtual module which is corresponding to the faulted module.

12. The system according to claim 7, wherein, when the service processing module of one of the at least two short message offices fails, the virtual service processing module is configured to: receive an AO message from the SMPP AGENT module of the one short message office which is sent originally to the faulted service processing module of the one short message office, select another short message office based on the configured load-balancing policy, and forward the AO message to the service processing module of the selected short message office in the same layer; and the virtual SMPP AGENT module is configured to: receive an AO response message from the service processing module of the selected short message office, and forward the AO response message to the SMPP AGENT module of the one short message office based on the forwarding relation table.

13. The system according to claim 12, wherein,
said configuration management module is further configured to monitor load status of modules of said at least two short message offices which are corresponding to the faulted module, and provide the load-balancing policy for the virtual module which is corresponding to the faulted module.

14. The system according to claim 7, wherein, when the SMPP AGENT module of one of the at least two short message offices fails,
the virtual SMPP AGENT module is configured to: receive an AT message from the service processing module of the one short message office which is sent originally to the faulted SMPP AGENT module of the one short message office, select another short message office based on the configured load-balancing policy, and forward the AT message to the SMPP AGENT module of the selected short message office in the same layer; and
the virtual service processing module is configured to: receive an AT response message from the SMPP AGENT module of the selected short message office, and forward the AT response message to the service processing module of the one short message office based on the forwarding relation table.

15. The system according to claim 14, wherein,
said configuration management module is further configured to monitor load status of modules of said at least two short message offices which are corresponding to the faulted module, and provide the load-balancing policy for the virtual module which is corresponding to the faulted module.

16. The system according to claim 7, wherein,
said configuration management module is further configured to monitor load status of modules of said at least two short message offices which are corresponding to the faulted module, and provide the load-balancing policy for the virtual module which is corresponding to the faulted module.

* * * * *